(12) United States Patent
McFarland et al.

(10) Patent No.: US 6,349,978 B1
(45) Date of Patent: Feb. 26, 2002

(54) PIPE CONNECTIONS

(75) Inventors: Robert Stanley McFarland; Norman Andrew Logan, both of County Down; Richard William Henry Kee, Strabane, all of (GB)

(73) Assignee: Munster Simms Engineering Limited, County Down (IR)

( * ) Notice: Subject to any disclaimer, the term of this patent is extended or adjusted under 35 U.S.C. 154(b) by 0 days.

(21) Appl. No.: 09/554,957

(22) PCT Filed: Nov. 20, 1998

(86) PCT No.: PCT/GB98/03514

§ 371 Date: Jul. 24, 2000

§ 102(e) Date: Jul. 24, 2000

(87) PCT Pub. No.: WO99/27290

PCT Pub. Date: Jun. 3, 1999

(30) Foreign Application Priority Data

Nov. 20, 1997 (GB) .............................................. 9724521

(51) Int. Cl.⁷ .............................................. F16L 37/084
(52) U.S. Cl. ........................................ 285/319; 285/322
(58) Field of Search ................................ 285/319, 322, 285/39

(56) References Cited

U.S. PATENT DOCUMENTS

| | | | | |
|---|---|---|---|---|
| 5,112,086 A | * | 5/1992 | Gruber et al. | 285/319 |
| 5,154,450 A | * | 10/1992 | Washizu | 285/319 |
| 5,161,832 A | * | 11/1992 | McNaughton et al. | 285/319 |
| 5,163,720 A | * | 11/1992 | Abe | 285/319 |
| 5,324,082 A | * | 6/1994 | McNaughton et al. | 285/319 |
| 5,915,738 A | * | 6/1999 | Guest | 285/322 |
| 5,934,713 A | * | 8/1999 | Guest | 285/322 |
| 6,199,920 B1 | * | 3/2001 | Neustadtl | 285/322 |

FOREIGN PATENT DOCUMENTS

| | | | | |
|---|---|---|---|---|
| DE | 4334529 | * | 4/1994 | 285/322 |
| WO | WO-94021953 | * | 9/1994 | 285/322 |

\* cited by examiner

*Primary Examiner*—Eric K. Nicholson
(74) *Attorney, Agent, or Firm*—Ronald E. Greigg

(57) ABSTRACT

A pipe connection has a coupling with one or more socket ends, the or each of which is defined by a circumferential wall surround in which a plurality of four spaced apertures are provided. An annular seal is provided at the inner end of the or each socket end. A collet is provided for location in the or each socket end, the or each collet has a corresponding plurality of four spaced resiliently mounted legs. The legs are co-parallel with the axis of the collet and has similar barb portions each to enter and be held in a corresponding aperture of the respective socket end whereby to hold the collet and therefore the seal in portion in the or each socket end.

20 Claims, 3 Drawing Sheets

PIPE CONNECTIONS

BACKGROUND OF THE INVENTION

1. Field of Invention

This invention relates to pipe connections through which lengths of piping can be coupled into a pipe system for use particularly, but not exclusively, in a mobile structure, for example a caravan, or a boat. The connections are couplings which may be in any form, for example straights, elbows or T-junctions, with each coupling having one or more socket ends into each one of which socket ends a leading end of a length of piping is fitted.

2. Summary of the Invention

Accordingly, the present invention is a pipe connection having a coupling with one or more socket ends defined by a circumferential wall surround in which a plurality of spaced apertures are provided, an annular seal provided at the inner end of each socket end and a collet for location in each socket end, each collet having a corresponding plurality of spaced resiliently mounted legs to the plurality of apertures, the legs being co-parallel with the axis of the collet and having similar barb portions each to enter and be held in a corresponding aperture of the respective socket end whereby to hold the collet, and therefore the seal in position in the socket end.

Each collet preferably has two similar rings, an inner ring and an outer ring, spaced apart axially and held together by a series of posts forming a cage which rigidly supports the piping. Between each two adjacent posts and the rings, a window is beneficially defined in which one of the legs is positioned, the leg being rooted to the outer ring with the leg extending towards the inner ring. A collet is desirably intended for positioning in the respective socket end with the distal ends of the legs directed innermost and with the inner ring innermost. The outer ring beneficially is an angular flange which overlies the outer end of a socket end into which a collet is fitted. The portion of the inner ring in each window has preferably a castellation extending into the window and whose purpose is to restrict inward movement of a respective leg beyond a predetermined limit.

The barb portion for each leg preferably has an outward downwardly sloping face, and an inward radial face, the sloping face commencing inward of the outer ring inclining to stop short of the outer edge of the radial face to form a ledge, the barb portion, when engaged in an aperture, preventing removal of the collet from the respective socket end. Each leg is similar and its inner face may be radially curved along its length.

An inner part of the socket end preferably is of reduced diameter with a first shoulder provided against which the collet lies. The seal may be an O-ring provided to seat between the shoulder and the inner ring of a respective collet.

Preferably, the wall surround of the socket end towards the end face is cut-away between the outer and inner edges of the wall surround to provide an inwardly sloped guideway leading inwards to assist in a riding movement of the outer end of the radial face of the barb portions of the legs into the socket end, the riding movement flexing the legs inwardly with the legs returning to their normal position when the barb portions enter respective apertures. The sloped guideways are desirably radially offset from the apertures requiring the collet to be inserted then rotated for the barb portions to be aligned with and enter the corresponding apertures. The portions of the inside of the wall surround of the socket end between the end face and each window is beneficially provided with a swelling.

Preferably also, each leg has on its inner face opposite to the barb portion, a gripping edge. The gripping edges of the legs together form a broken internal circumferential zone for gripping the outside face of a leading end of a length of piping. The inner edge of the radial face at its junction with the inner face of each finger forms a heel, the heels of the fingers forming a second broken internal circumferential zone. Each leg is desirably provided with a knee at the start of the sloping face of the barb portion and extending along the barb portion a predetermined distance.

Each coupling, collet and piping are preferably of rigid material, either of synthetic plastics material or of a metal or of a metal alloy. The piping of semi-rigid plastics material allows the gripping edges to bite into its surface. However, if the piping is of a rigid plastics material, a metal or a metal alloy, two spaced annular recesses are provided into which the gripping edges and heels locate.

Preferably further, a tubular cover is provided to be located around each socket end to close off the apertures. The end of the tubular cover at the outer ring is beneficially extended and scalloped to mask the collet from unintentional inward movement.

BRIEF DESCRIPTION OF THE DRAWINGS

An embodiment of the present invention will now be described, by way of example, with reference to the accompanying drawings, in which.

Figure 1A:
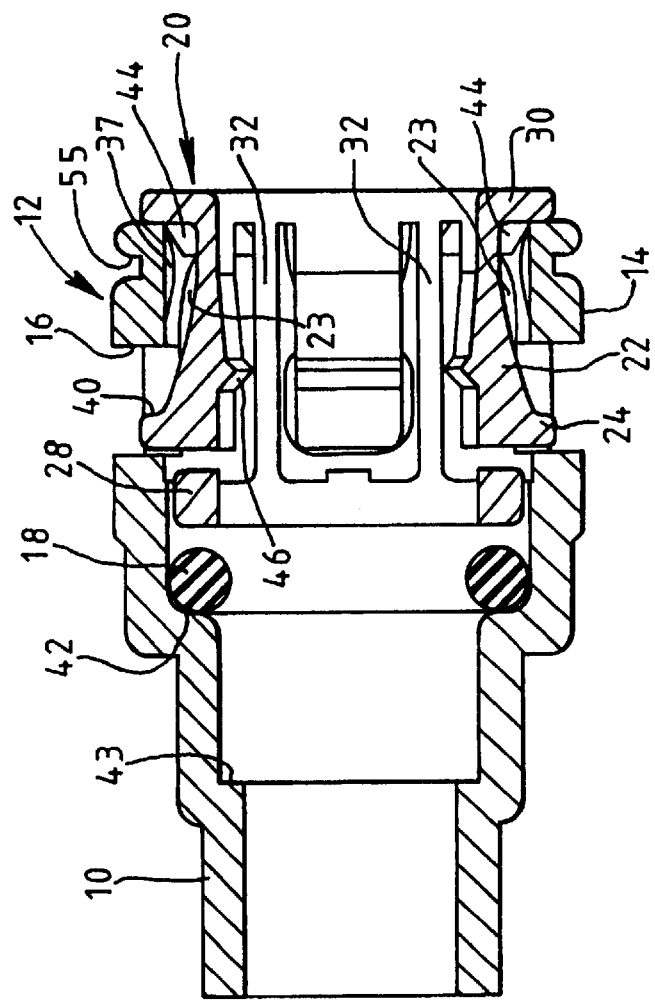
FIGS. 1A and 1B are respectively a cross-sectional view of a pipe connection according to the present invention showing a socket end, an O-ring seal and a collet, and a cross-sectional view of a collet.
Figure 1B:
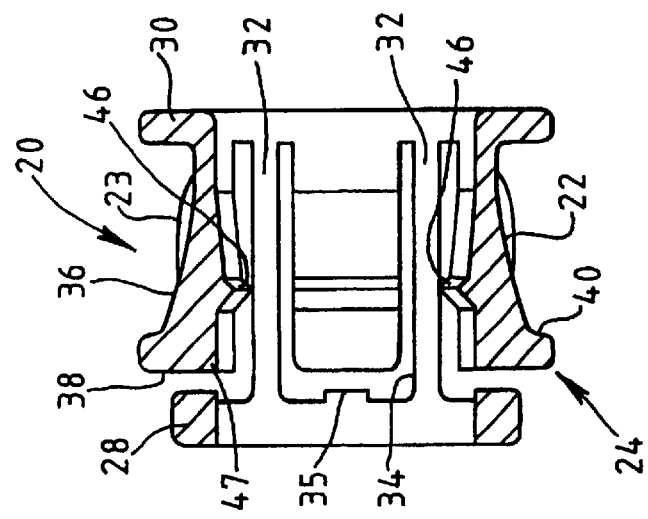
Figure 2A:
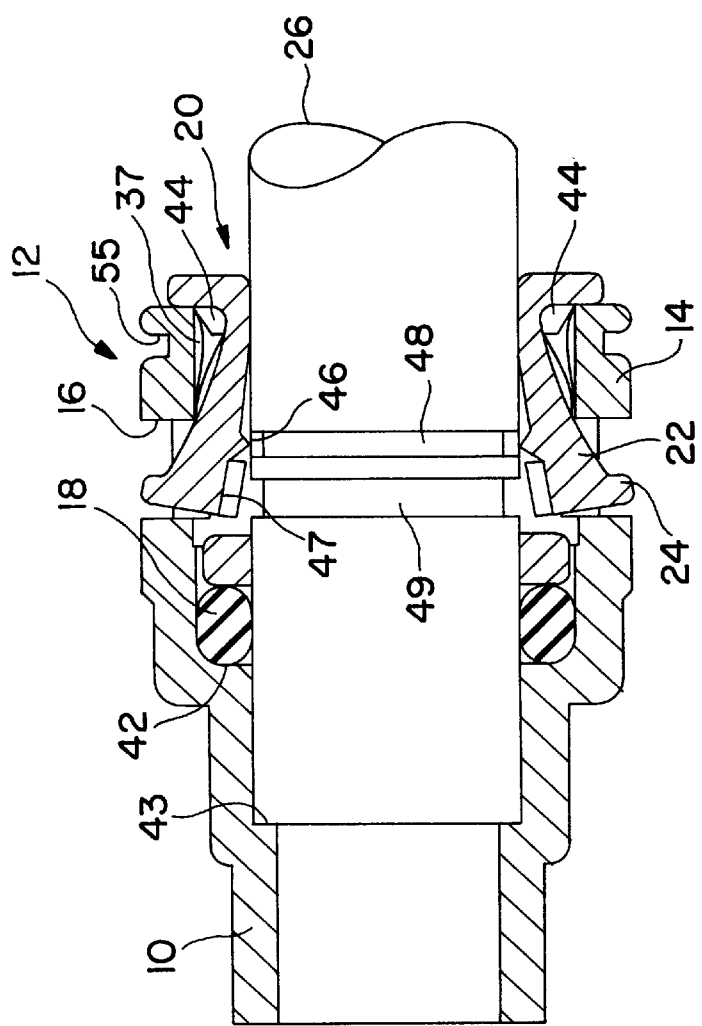
FIGS. 2A and 2B are respectively a cross-sectional view of a pipe assembly including a connection and a leading end of a length of pipe, and a cross-sectional view of a collet with fingers displayed.
Figure 2B:
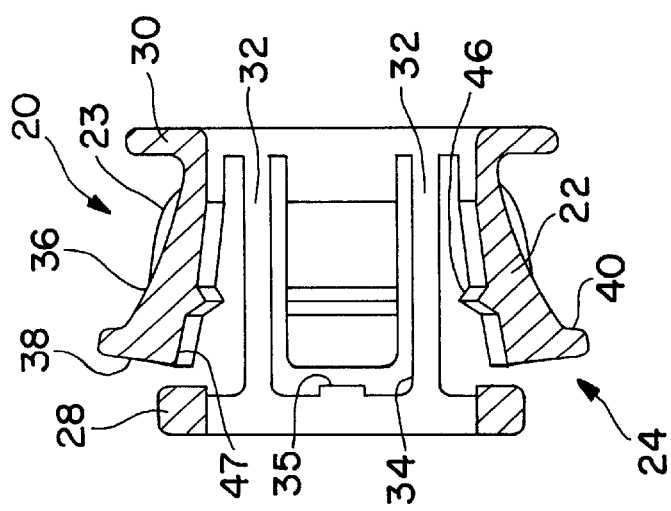
Figure 3A:
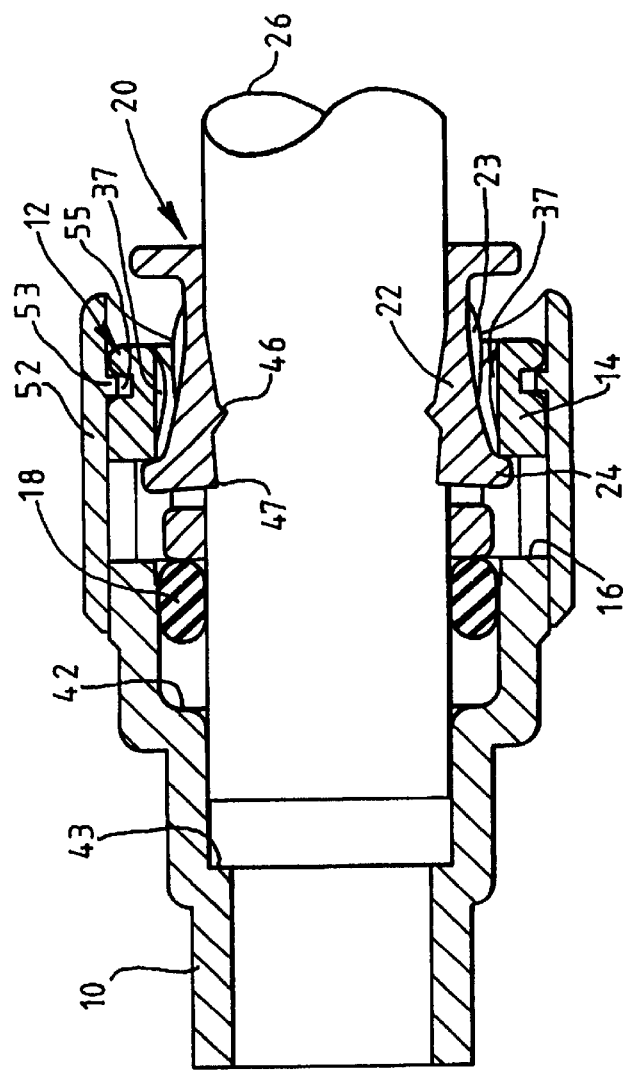
FIGS. 3A and 3B are respectively a cross-sectional view of the pipe assembly when the piping is being pulled outwardly and a cross-sectional view of a collet with fingers inwardly displaced.
Figure 3B:
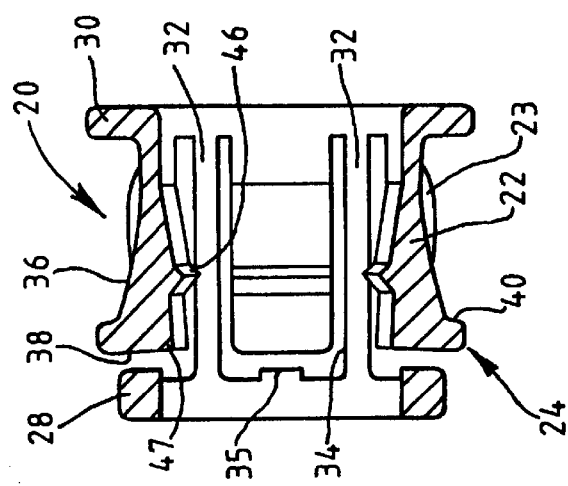

Referring to the drawings, a pipe connection has a coupling 10 with one or more socket ends 12, each of which is defined by a circumferential wall surround 14 in which a plurality of four equi-spaced apertures 16 are provided, an annular seal 18 provided at the inner end of the socket end 12 and a collet 20 for location in the socket end 12. The collet 20 has a corresponding plurality of four equi-spaced resiliently mounted legs 22, i.e., the same number as in the plurality of apertures 16. The legs 22 are co-parallel with the axis of the collet 20 and has similar barb portions 24 each to enter and be held in a corresponding aperture 16 of the respective socket end 12 whereby to hold the collet 20, and therefore the seal 18 and any piping 26 therein, in position in the socket end 12.

Each collet 20 has two similar rings, an inner ring 28 and an outer ring 30 spaced apart axially and held together by a series of posts 32 forming a cage which serves to fully support the piping 26 thus preventing leakages resulting from side loads on piping 26 or ovality in the piping 26. The inner ring 28 also serves as a washer. Between each two adjacent posts 32 and the rings 28, 30, a window 34 is defined in which one of the legs 22 is positioned with the leg 22 being rooted to the outer ring 30 and extending towards the inner ring 28. A collet 20 is intended for positioning in the respective socket end 12 with the distal ends of the legs 22 directed innermost and with the inner ring 28 innermost.

The outer ring 30 is an annular flange which overlies the outer end of a socket end 12 into which a collet 20 is fitted. The portion of the inner ring 28 in each window 34 has a castellation 35 mid-way of the portion extending into the window 34 and whose purpose is to restrict inward movement of a respective leg 22 beyond a predetermined limit.

The barb portion 24 for each leg 22 has an outward downwardly sloping face 36, and an inward radial face 38. The sloping face 36 commences inward of the outer ring 30 and inclining to stop short of the outer edge of the radial face 38 to form a ledge 40. The barb portion 24, when engaged in an aperture 16, prevents removal of the collet 20 from the respective socket end 12. Each leg 22 is similar and its inner face is radially curved about its length. If the piping is pulled outwardly, the sloping face 36 of each barb portion, acting on the aperture surround causes the gripping edges to be described hereinafter to bite further into the piping to prevent removal.

An inner part of the socket end 12 is of reduced diameter with a first shoulder 42 provided against which the inner ring 28 of the collet 20 lies. The reduced diameter part of the socket end 12 is further reduced creating a second shoulder 43 against which the leading end of a length of piping 26 abuts. The seal 18 is an O-ring provided to seat between the first shoulder 42 and the inner ring 28 of a respective collet 20.

The wall surround 14 of the socket end 12 towards the end face is cut-away between the outer and inner edges of the wall surround 14 to provide an inwardly sloped guideway 44 leading inwards to assist in a riding movement of the outer end of the radial face 38 of the barb portions 24 of the legs 22 into the socket end 12, the riding movement flexing the legs 22 inwardly with the legs 22 returning to their normal position when the barb portions 24 enter respective apertures 16. The sloped guideways are radially offset by forty-five angular degrees from the aperture requiring the collet 20 to be inserted then rotated through forty-five angular degrees for the barb portions 24 to be aligned with and enter the corresponding apertures 16. The portions of the inside of the wall surround of the socket end 12 between the end face and each aperture 16 is provided with a swelling 37.

Each leg 22 has on its inner face opposite to the barb portion 24, a gripping edge 46. The gripping edges 46 of the legs 22 together form a broken internal circumferential zone for gripping the outside face of a leading end of a length of piping 26. The inner length of the radial face 38 at its junction with the inner face of each leg 22 forms a heel 47, the heels 47 of the legs 22 forming a second broken internal circumferential zone. Each leg 22 is provided with a knee 23 at the start of the sloping face 36 of the barb portion 24 and extending along the barb portion 24 a predetermined distance.

The piping 26 can be removed from the respective collet 20 by inwardly pressing the outer ring 30 of the collet 20 and pulling the piping 26 outwards.

Each coupling 10, collet 20 and piping 26 preferably are of rigid or same rigid material, either of synthetic plastics material or of a metal or of a metal alloy. The piping 26 of semi-rigid plastics material allows the gripping edges 46 and heels 47 to bite into its surface. However, if the piping is of a rigid plastics material, metal or a metal alloy, two suitably positioned annular recesses 48, 49 are provided into which the gripping edges 46 and heels 47 locate. Also, if two couplings, are to be connected together, a spigot end is provided on one coupling 10 having two annular recesses.

A tubular cover 52 is provided to be located around each socket end to close off the apertures 16. The end of the tubular cover 52 at the outer ring 30 is extended beyond the outer ring 30 and is scalloped. The cover 52 is to mask the outer ring 30 of the collet 20 and prevent it from unintentional inward movement. The tubular cover 52 has an internal circumferential rib 53 to mate with a corresponding external groove 55 on each socket end 12.

Pipe connections of the type described above allow for rapid assembly of a pipe system with the ends of lengths of piping 26 simply being push-fitted into socket ends of couplings. The connections give secure liquid-sealed joints.

In use, a pipe system is fabricated as required using pipe connections as hereinbefore described with the ends of the lengths of piping 26 being pushed into the collets 20 until the ends abut the respective second shoulder 43, the O-ring seat 18 being tightly fitted around the piping 26 to prevent leakage of fluid passing through the piping 26 and the connections, and the gripping edges of the collet 20 holding the piping 26 from removal, gripping edges 46 biting into the respective piping to prevent removal.

In a normal flow pipe system, there is a normal temperature rating and a normal pressure rating. However, in certain circumstances either or both these ratings can increase. It has been found in test that a pipe connection with piping therein as above described will not separate under extreme pressure, but rather the collet will move to an outward position in its location in its respective socket end which enables the seal to move up and corresponding parts will enter the apertures and allow release of a necessary amount of fluid to bring down the pressure and will then return to its normal position without suffering damage. Thus the individual connections between piping and respective pipe connections each serves as a pressure relief valve. This is a very beneficial advantage of this invention.

The design of the collet cage significantly reduces the risk of leakage passed the O-ring seal.

In a modification, more or less than four apertures 16 and a corresponding number of legs 22 with barb portions 24 can be provided.

Variations and other modifications can be made without departing from the scope of the invention described above and as claimed hereinafter.

The foregoing relates to preferred exemplary embodiments of the invention, it being understood that other variants and embodiments thereof are possible within the spirit and scope of the invention, the latter being defined by the appended claims.

We claim:

1. A pipe connection having a coupling with a socket end defined by a circumferential wall surround having outer and inner edges and in which a plurality of peripherally-spaced radial apertures are provided, an annular seal provided at the axial inner end of the socket end and a single piece collet provided for location in the socket end, the collet having a corresponding plurality of spaced resiliently mounted, radial legs to the plurality of apertures, the collet having a longitudinal axis with the legs being parallel with the collet axis and having similar outwardly-projecting barb portions each to enter and be held in a corresponding aperture of the socket end whereby to hold the collet, and therefore the seal in position in the socket end, the collet having two complete rings of similar diameter, a first or inner ring for location at the axial inner end of the socket end, and a second or outer ring for location at the axial outer end of the socket end, the rings being spaced apart axially and held together by a series of posts forming a cage which, in use, rigidly supports a leading end of a length of pipe fitted thereinto, each two adjacent posts and the rings of the cage cooperating to define a window in which one of the legs is positioned, a portion of the inner ring of each window having a castellation extending into the window to restrict inward movement of a respective leg beyond a predetermined limit.

2. A pipe connection according to claim 1, wherein the leg in each window is rooted to the outer ring with the leg extending towards the inner ring.

3. A pipe connection according to claim 1, wherein the collet is adapted to be positioned in the socket end with the distal ends of the legs directed innermost and with the inner ring innermost.

4. A pipe connection according to claim 1, wherein the outer ring is an annular flange which overlies the outer end of a socket end into which the collet is fitted.

5. A pipe connection according to claim 1, wherein the barb portion for each leg has an outward downwardly sloping face, and a rearward radial face, the sloping face commencing inward of the outer ring and stopping short of the outer edge of the radial face to form a ledge.

6. A pipe connection according to claim 5, wherein portions of the wall surround of the socket end is cut-away between the outer and inner edges of the wall surround to provide a plurality of inwardly sloped guideways leading inwards to assist in a riding movement of the outer end of the radial face of the barb portions of the legs into the socket outer end, the riding movement flexing the legs inwardly with the legs returning to their normal position when the barb portions enter respective apertures.

7. A pipe connection according to claim 6, wherein the sloped guideways are radially offset from the apertures requiring the collet to be inserted then rotated for the barb portions to be aligned with and enter the corresponding apertures.

8. A pipe connection according to claim 5, wherein each leg is provided with a knee at the start of the sloping face of the barb portion and extending along the barb portion a predetermined distance.

9. A pipe connection according to claim 1, wherein each leg is similar and its inner face is radially curved along its length.

10. A pipe connection according to claim 1, wherein an inner part of the socket end is of reduced diameter defining a first shoulder providing a stop for the inner ring of the collet.

11. A pipe connection according to claim 10, wherein the seal is an O-ring provided to seat between the first shoulder of the socket end and the inner ring of the respective collet.

12. A pipe connection according to claim 1, wherein portions of the inside wall of the wall surround of the socket end between the end face and each aperture is provided with a swelling.

13. A pipe connection according to claim 1, wherein each leg has on its inner face opposite to the barb portion, a gripping edge.

14. A pipe connection according to claim 13, wherein the gripping edges of the legs together form a broken internal circumferential zone for gripping the outside face of a leading end of a length of pipe.

15. A pipe connection according to claim 14, wherein the inner edge of the radial face of each barb portion at its junction with the inner face of each leg forms a heel, the heels of the legs forming a second broken internal circumferential gripping zone.

16. A pipe connection according to claim 1, wherein a tubular cover is provided to be located around the or each socket end to close off the apertures.

17. A pipe connection according to claim 16, wherein the tubular cover has an internal circumferential rib to mate with a corresponding external groove in each socket end.

18. A pipe connection according to claim 17, also wherein the end of the tubular cover at the outer ring is extended and scalloped to mask the collet from unintentional inward movement.

19. A pipe assembly comprising one or more pipe connections according to claim 1, and a length of piping pushed into the collet in the or each socket end.

20. A pipe assembly according to claim 19, wherein the leading end of the length of piping when of rigid material is provided with two spaced annular recesses into which the gripping edges and heels of a respective pipe connection locate.

* * * * *